(12) United States Patent
Nagano

(10) Patent No.: US 8,710,509 B2
(45) Date of Patent: Apr. 29, 2014

(54) LIQUID CRYSTAL PANEL AND LIQUID CRYSTAL DISPLAY

(75) Inventor: Shingo Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 13/287,515

(22) Filed: Nov. 2, 2011

(65) Prior Publication Data

US 2012/0112200 A1 May 10, 2012

(30) Foreign Application Priority Data

Nov. 8, 2010 (JP) ................................. 2010-249887

(51) Int. Cl.
*H01L 27/15* (2006.01)

(52) U.S. Cl.
USPC .......................................................... 257/72

(58) Field of Classification Search
USPC .......................................................... 257/72
See application file for complete search history.

(56) References Cited

U.S. PATENT DOCUMENTS

| 6,292,237 | B1 | 9/2001 | Hebiguchi |
| 2006/0164350 | A1 | 7/2006 | Kim et al. |
| 2009/0207365 | A1* | 8/2009 | Lee et al. ..................... 349/141 |
| 2010/0187532 | A1 | 7/2010 | Nagano et al. |

FOREIGN PATENT DOCUMENTS

| JP | 2000-35589 | 2/2000 |
| JP | 2006-178461 | 7/2006 |
| JP | 2010-191410 | 9/2010 |

* cited by examiner

*Primary Examiner* — Matthew W Such
*Assistant Examiner* — Robert Carpenter
(74) *Attorney, Agent, or Firm* — Oblon, Spivak, McClelland, Maier & Neustadt, L.L.P.

(57) ABSTRACT

A liquid crystal panel, comprising: an array substrate including: a display area, in which pixels disposed, wherein the pixel includes: a switching device; a lower electrode; an insulating layer formed on the lower electrode; an upper electrode, which has a plurality of slits to generate a fringe electric field; and a common signal line; a scanning line; a signal line crossing the scanning line; and a contact hole; and an opposite substrate, wherein one electrode of the upper electrode and the lower electrode is a pixel electrode connected to the switching element, and the other electrode thereof is a common electrode, wherein the signal line is disposed at every two pixels adjacent in a scanning line direction, wherein the contact hole is shared by the adjacent two pixels and is formed at an intervening region of the two adjacent pixels in which the signal line is not provided.

12 Claims, 8 Drawing Sheets

LIQUID CRYSTAL PANEL AND LIQUID CRYSTAL DISPLAY

CROSS-REFERENCE TO RELATED APPLICATION

This application claims priority from Japanese Patent Application No. 2010-249887 filed on Nov. 8, 2010, the entire subject matter of which is incorporated herein by reference.

TECHNICAL FIELD

The present disclosure relates to a liquid crystal panel and a liquid crystal display. Specifically, the present disclosure relates to a pixel configuration of a liquid crystal panel and a liquid crystal display of a fringe field switching (FFS).

BACKGROUND

Recently, instead of conventional cathode-ray tubes, new display devices having a thin and flat shape using a liquid crystal or an electroluminescence is being widely used. A liquid crystal display as a representative new display device has not only a thin shape and a light weight but also a characteristic capable of being driven at a low voltage. The liquid crystal display includes a liquid crystal panel, in which a liquid crystal is sealed between two substrates as a main component. One of the two substrates is an array substrate, in which a plurality of pixels is disposed in a matrix form to configure a display area. The other substrate is an opposite substrate (color filter substrate), in which a color filter or a black matrix (light shielding layer) corresponding to each pixel is disposed to be opposite to the array substrate.

Specifically, a thin film transistor (TFT) type liquid crystal display can display a high-quality image having little crosstalk, because the TFT is provided in the each pixel on the array substrate as a switching element and the each pixel can independently maintain voltages for driving the liquid crystal. The each pixel includes a scanning line (a gate line) to control ON and OFF of the TFT, and a signal line (a source line) to input an image signal. Generally, the each pixel corresponds to an area surrounded by the scanning line and the signal line across the scanning line.

Since the scanning line and the signal line are generally formed of an opaque metallic layer having a small specific resistance, it is preferable that a ratio of the opaque metallic layer to an area of the pixel set to be small, in order to increase an aperture ratio (light transmittance). In addition, it is preferable that an area of the black matrix (light shielding layer), which is formed on the opposite substrate, to shield unnecessary light-leakage from the pixel set to be small.

In general, the TFT liquid crystal display requires one scanning signal line and one signal line for every pixel. However, when there are a number of signal lines, an expensive driving circuit is needed to drive the signal lines, thereby increasing the manufacturing cost of the liquid crystal display.

Accordingly, JP-A-2000-035589 and JP-A-2006-178461 disclose a configuration, in which two pixels adjacent to both sides of adjacent signal lines are driven by one signal line so that the number of signal lines is reduced by half.

Instead, although the number of scanning lines increases twice, a scanning line driving circuit is a simple shift resistor circuit that performs merely ON and OFF of the TFT in sequence. Meanwhile, a signal line driving circuit converts a digital signal of an image to an analog voltage signal and temporarily maintains the signal. Accordingly, the scanning line driving circuit is low cost as compared with the signal line driving circuit, and the configuration in which the number of the signal lines is reduced by half can reduce the manufacturing cost of the liquid crystal display.

On the other hand, in order to achieve the characteristic of a wide viewing angle, JP-A-2010-191410 discloses that a FFS liquid crystal display which is a kind of In-Plane Switching modes. In the FFS liquid crystal display, a pixel electrode and a common electrode, which generates electric fields to drive the liquid crystal, are formed on the array substrate and laminated with sandwiching an insulating layer. An upper electrode includes slits formed as a plurality of openings and the liquid crystal is driven by a fringe electric field generated between a lower electrode and the upper electrode through the slits. In the pixel electrode and the common electrode, one electrode may be used as the upper electrode and the other electrode may be used as the lower electrode. In general, in the FFS liquid crystal display, the pixel electrode and the common electrode are formed by a transparent conductive layer such as ITO (Indium Tin Oxide). Accordingly, a film portion of the pixel electrode and the common electrode is capable of light transmitting by the fringe electric field.

However, when the configuration that the number of signal lines is reduced by half is applied to the liquid crystal display, in order to shield the light leakage between the pixels, the black matrix needs to be disposed even on a area, in which signal line is not disposed between two adjacent pixels, of the opposite substrate as the same as a area in which the signal line is disposed. As a result, since the number of scanning lines becomes twice, there is a problem in that the aperture ratio of the pixel becomes smaller than that of a general configuration. Specifically, when the configuration that the number of signal lines is reduced by half is applied to the liquid crystal panel and liquid crystal display of the FFS type, a pixel configuration capable of increasing the aperture ratio is not fully considered.

In view of the above, the present disclosure is to provide a liquid crystal panel. Specifically, when the configuration that the number of signal lines is reduced by half is applied to the liquid crystal panel and liquid crystal display of the FFS type, the liquid crystal display capable of suppressing deterioration of the aperture ratio and increasing the aperture ratio as compared with the case where the configuration, in which the number of signal lines is reduced by half, is simply applied to a background pixel configuration.

SUMMARY

A liquid crystal panel of the present discloser includes: an array substrate including: a display area, in which a plurality of pixels disposed in a matrix form on a substrate; a scanning line; a signal line crossing the scanning line; and a contact hole; and an opposite substrate including a black matrix and arranged to be opposite to the array substrate with sandwiching a liquid crystal. The pixel includes: a switching device; a lower electrode; an insulating layer formed on the lower electrode; an upper electrode, which has a plurality of slits to generate a fringe electric field between the lower electrode and the upper electrode, and which is formed on the insulating layer; and a common signal line, which supplies a predetermined common potential, and which is formed at a layer lower than the insulating layer. One electrode of the upper electrode and the lower electrode is a pixel electrode connected to the switching element, and the other electrode thereof is a common electrode having the predetermined common potential, wherein the signal line is disposed at every two pixels adjacent in a scanning line direction, wherein the contact hole connects the common electrode and the common signal line, wherein the contact hole is shared by the adjacent two pixels and is formed at an intervening region of the two adjacent pixels in which the signal line is not provided.

According to the present disclosure, it is possible to increase the aperture ratio in the liquid crystal panel and liquid crystal display of the FFS type, as compared with the case where the configuration, in which the number of signal lines is reduced by half, is simply applied to a background pixel configuration.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTIONS

Figure 1:
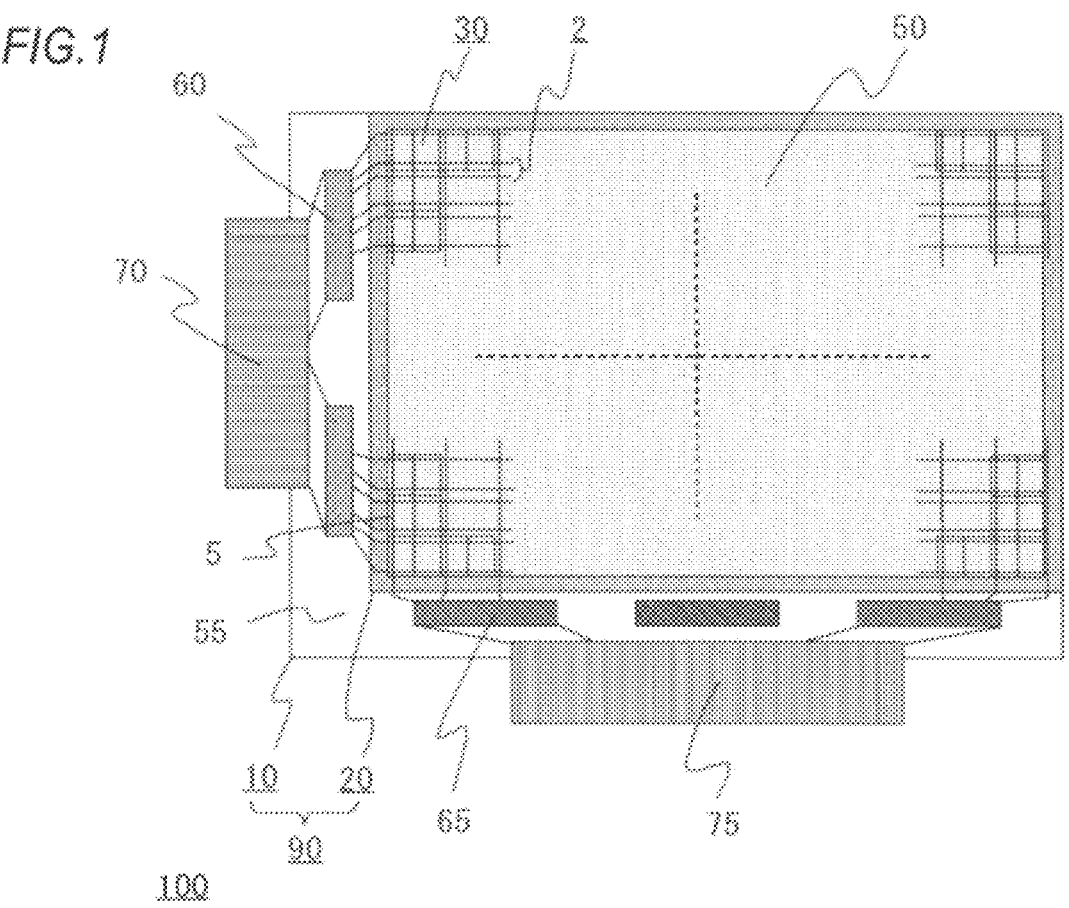
FIG. 1 is a schematic plan view illustrating a configuration of a liquid crystal display according to an exemplary embodiment 1 of the present disclosure.

Hereinafter, the exemplary embodiments for a liquid crystal panel and a liquid crystal display of the present disclosure will be described with reference to the accompanying drawings. In the drawings for describing the exemplary embodiments to be described below, same reference numerals indicate a like or similar element, and detailed descriptions thereof will be properly omitted.

Exemplary Embodiment 1

First, a configuration of a liquid crystal display will be briefly described. FIG. 1 is a schematic plan view illustrating a configuration of a liquid crystal display according to an exemplary embodiment 1 of the present disclosure.

A FFS liquid crystal display 100 is configured by a liquid crystal panel 90 as a main component and so on. A liquid crystal is sealed between two substrates, which are an array substrate 10 and an opposite substrate 20 configuring the liquid crystal panel 90. In the array substrate 10, a plurality of pixels 30 configuring a display area 50 are arranged in a matrix form. A scanning line 2, a signal line 5, a TFT as a switching element, a common signal line, a pixel electrode, and a common electrode, which configure the pixels 30 (and which are not shown in FIG. 1), are formed on the array substrate 10. The opposite substrate 20 is opposite to the display area 50 of the array substrate 10 with sandwiching a liquid crystal, and a color filter or a black matrix is formed on the opposite substrate 20.

On a transparent substrate 1 made of glass or plastic, the array substrate 10 is roughly divided into the display area 50 and a frame area 55 around the display area 50. A scanning line driving circuit 60 and a signal line driving circuit 65 are mounted on the frame area 55 by a chip on glass (COG) mounting technology in liquid crystal display 100. A plurality of connection terminals (not shown) for connecting an external circuit, which supplies reference voltage and a clock, image data, and the like to the scanning line driving circuit 60 and the signal line driving circuit 65, are disposed at ends of the array substrate 10, and flexible substrates 70 and 75 are connected to the ends of array substrate 10.

In the liquid crystal display 100, a polarizing plate (not shown) or a phase plate (not shown) is attached to both sides of the liquid crystal panel 90, if necessary. A backside light source (a backlight), an external circuit or a case is included within the liquid crystal display 100.

There are a plurality of the scanning lines 2 extending to an output part of the scanning line driving circuit 60 from the display area 50, a plurality of the signal lines 5 extending to an output part of the signal line driving circuit 65 from the display area 50, a plurality of input lines connecting the plurality of connection terminals with a plurality of input parts of the scanning line driving circuit 60 and the driving circuit 65 of the signal line. However, to simplify the drawings, only a part of them is shown in FIG. 1.

In the small-sized liquid crystal display 100, because the total number of lines is relatively small, a driving circuit integrating the scanning line driving circuit 60 and the driving circuit 65 of the signal line is used in many case. In addition, the flexible substrates 70 and 75 are integrated into one in many cases.

Figure 2:
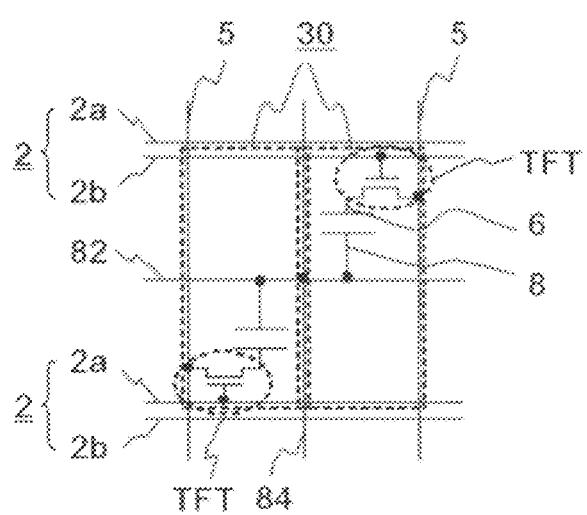
FIG. 2 is an equivalent circuit diagram illustrating a configuration of two adjacent pixels in the liquid crystal display according to an exemplary embodiment 1 of the present disclosure.

FIG. 2 is an equivalent circuit diagram view illustrating a configuration of two adjacent pixels in the liquid crystal display according to an exemplary embodiment 1 of the present disclosure. Herein, one signal line 5 is disposed at every two pixels 30 adjacent in a direction of the scanning line 2 (2a and 2b) with crossing. Instead of the signal line, two scanning lines 2a and 2b are disposed.

Each of the scanning lines 2a and 2b is connected to one of TFTs of two adjacent pixels 30, and signal line 5 is connected to a pixel electrode 6 through the TFT. The TFTs of two adjacent pixels 30 are disposed in a reverse direction, respectively.

A common electrode 8 is disposed to be opposite to the pixel electrode 6 and generates a fringe electric field to drive the liquid crystal. Herein, the common electrode 8 is connected to a common signal line 82 to supply a predetermined common potential (a reference potential) in a direction of the scanning line 2 (2a and 2b).

In the exemplary embodiment 1, although it will be described below in detail, one common electrode 8 is connected with the other common electrode 8 of an adjacent pixel 30 by a common electrode connecting part 84 formed at the same layer as the common electrode 8 across the scanning line 2 (2a and 2b) in a direction of the signal line 5.

As a result, the common electrode 8 of each of the pixel 30 is electrically connected with the common electrode 8 of the vertically and horizontally adjacent pixels 30, and has a predetermined common potential.

Figure 3:
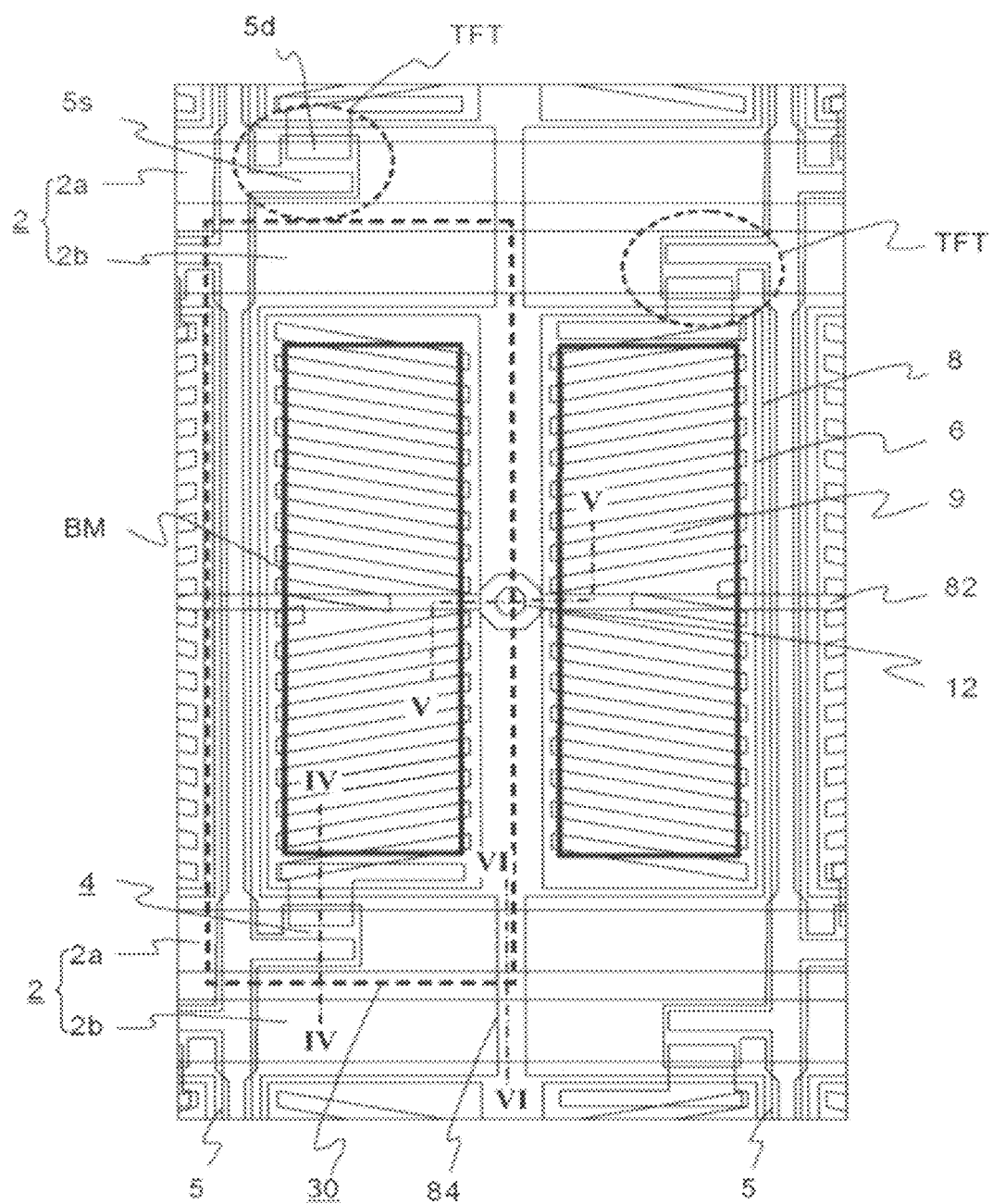
FIG. 3 is an enlarged plan view illustrating a configuration of two adjacent pixels in the liquid crystal display according to an exemplary embodiment 1 of the present disclosure.
Figure 4:
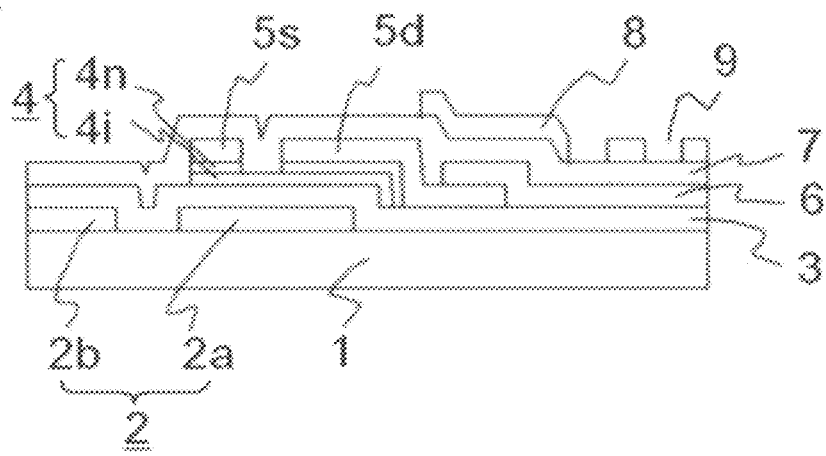
FIG. 4 is a cross-sectional view taken along a line IV-IV of FIG. 3.
Figure 5:
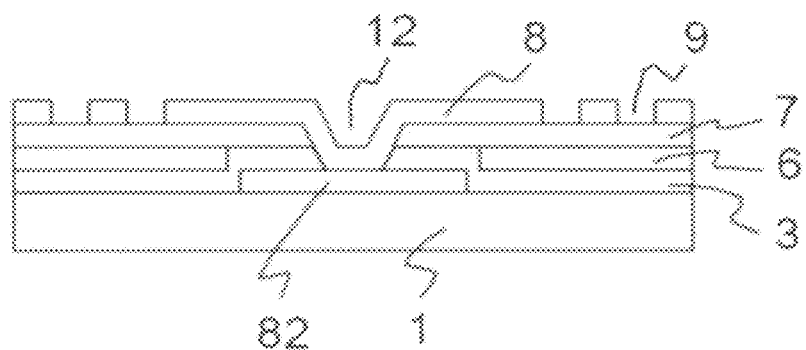
FIG. 5 is a cross-sectional view taken along a line V-V of FIG. 3.
Figure 6:
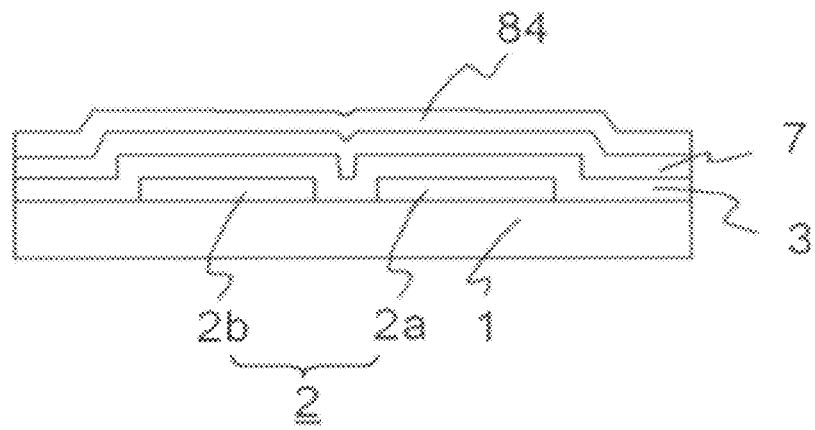
FIG. 6 is a cross-sectional view taken along a line VI-VI of FIG. 3.

FIG. 3 is an enlarged plan view illustrating the configuration of two adjacent pixels in the liquid crystal display according to an exemplary embodiment 1 of the present disclosure. FIG. 4 is a cross-sectional view taken along a line IV-IV of FIG. 3. FIG. 5 is a cross-sectional view taken along a line V-V of FIG. 3. FIG. 6 is a cross-sectional view taken along a line VI-VI of FIG. 3.

Hereinafter, a configuration of exemplary embodiment 1 will be described in detail with reference to a plan view of FIG. 3 and cross-sectional views of FIGS. 4 to 6.

The pixel electrode 6 and the common electrode 8 generate the fringe electric field as a one feature of the FFS liquid crystal display 100. According to an exemplary embodiment 1, a lower electrode is the pixel electrode 6 and is directly connected to a drain electrode 5*d* as shown in FIG. 4. A passivation layer 7 is formed on the signal line 5, the pixel electrode 6, and so on. The common electrode 8 is formed on the passivation layer 7 as an upper electrode. A plurality of slits 9 as openings is formed in the common electrode 8.

In each of the pixel 30, the plurality of slits 9 formed in the common electrode 8 have two directions symmetrically and slightly inclined at a predetermined equal angle with respect to the direction of the scanning line 2, respectively. Since the slits 9 have two directions, multi-domains (alignment divisions) are formed. Accordingly, a color change caused by the directions becomes small and a viewing angle characteristic is improved.

In this case, two pixels 30 adjacent in the direction of the scanning line 2 has a substantially rotationally symmetric shape with respect to a contact hole 12 as the center of rotation.

Next, as shown in FIG. 4, the TFT includes a gate electrode configured by a part of the scanning line 2 (2*a* and 2*b*), a semiconductor layer 4 (4*i* and 4*n*), a source electrode 5*s* and the drain electrode 5*d*, which are formed on a gate insulating layer 3. The semiconductor layer 4 is a laminated layer, which includes the semiconductor layer 4*i* not including impurity such as Si and the semiconductor layer 4*n* including impurity such as P. The semiconductor layer 4*n* of a channel part of the TFT between the source electrode 5*s* and the drain electrode 5*d* is removed.

As shown in FIG. 3, the semiconductor layer 4 is also disposed at the bottom of the signal line 5. The semiconductor layer 4 can suppress a disconnection or a short of the signal line 5 at a step portion at which the scanning line 2 (2*a* and 2*b*) or the common signal line 82 formed at the same layer as the scanning line 2 across the signal line 5.

Two rectangular areas indicated by a bold line in FIG. 3 are boundaries of black matrixes (BM) of two pixels 30 disposed on the opposite substrate 20. The inside of the each rectangular area is an opening of the black matrix (BM), and an aperture ratio of the pixel 30 is determined by the rectangular area. The outside of the each rectangular area is the black matrix area BM of the opposite substrate 20.

Next, as shown in FIGS. 3 and 5, in two pixels 30 adjacent in the direction of the scanning line 2, the common electrodes 8 of two adjacent pixels 30 are not separated and continuously connected to each other at the same layer, in an intervening region where there is no signal line 5.

Under the black matrix area BM, the contact holes 12 are formed at a double-layered insulating layer configured by the gate insulating layer 3 and the passivation layer 7 around the center of the intervening region, where there is no signal line 5, of two adjacent pixels 30 to electrically connect the common signal line 82 and the common electrode 8. Accordingly, the number of the contact holes 12 as an inefficient area for light transmission can be reduced to one in every two pixels 30.

Under the black matrix area BM, since the contact holes 12 can be formed at the area where there is no signal line 5, the deterioration in the aperture ratio due to the contact holes 12 can be suppressed. According to the above configuration, in case that the number of the signal lines 5 is reduced by half, although the number of the scanning lines 2 is twice, the deterioration in the aperture ratio of the pixel 30 can be suppressed.

As shown in FIGS. 3 and 6, the common electrode 8 is also connected to the common electrode 8 of two pixels 30 adjacent in the direction of the signal line 5, by the common electrode connecting part 84, which is formed at the same layer and is extending the common electrode 8 across the scanning line 2 (2*a* and 2*b*).

However, in this case, the common electrode connecting part 84 is not disposed on the TFT so that a common potential of the common electrode connecting part 84 does not influence the TFT characteristic when the common electrode connecting part 84 is disposed on the TFT.

Since the double-layered insulating layer configured by the gate insulating layer 3 and the passivation layer 7 is formed between the scanning line 2 (2*a* and 2*b*) and the common electrode connecting part 84, even if a defect such as a pin hole exists on one of the insulating layers, the shortage rarely occurs. As described above, since the common electrode 8 between pixels 30 is connected by the common electrode connecting part 84 in the direction of the signal line 5, low resistance of the common electrode 8 can be achieved. Further, even if a part of the common signal line 82, which is formed at the same layer as the scanning line 2, is disconnected, the predetermined common potential can be supplied to the common electrode 8 through the common electrode connecting part 84 in the direction of the signal line 5.

The configuration of exemplary embodiment 1 does not need to add a new manufacturing process, so that the manufacturing cost is not increased. As a result, since the number of the signal lines 5 is reduced by half, the cost of the signal line driving circuit 65 may be decreased, and the cost of the liquid crystal panel 90 and the liquid crystal display 100 may be decreased.

The contact hole 12 is commonly disposed at every two adjacent pixels and is connected to the common signal line 82. However, when the common electrode 8 is connected to the common electrode 8 of the two pixels 30 adjacent in the direction of the signal line 5 by the common electrode connecting part 84 as in the exemplary embodiment 1, it is not necessarily that one contact hole 12 is disposed at every two adjacent pixels 30. One contact hole 12 may be disposed at every four or more adjacent pixels 30 in the direction of the signal line 5. Even in this case, under the black matrix area BM, the contact hole 12 is disposed at the intervening region where there is no signal line 5 of the adjacent pixels 30.

In other views, since the contact hole 12 shared by the adjacent pixels 30 does not influence the aperture ratio at the intervening region, where there is no signal line 5, of the adjacent pixels 30, the contact hole 12 may be disposed in plural under the black matrix area BM.

Comparative Embodiment 1

Figure 7:
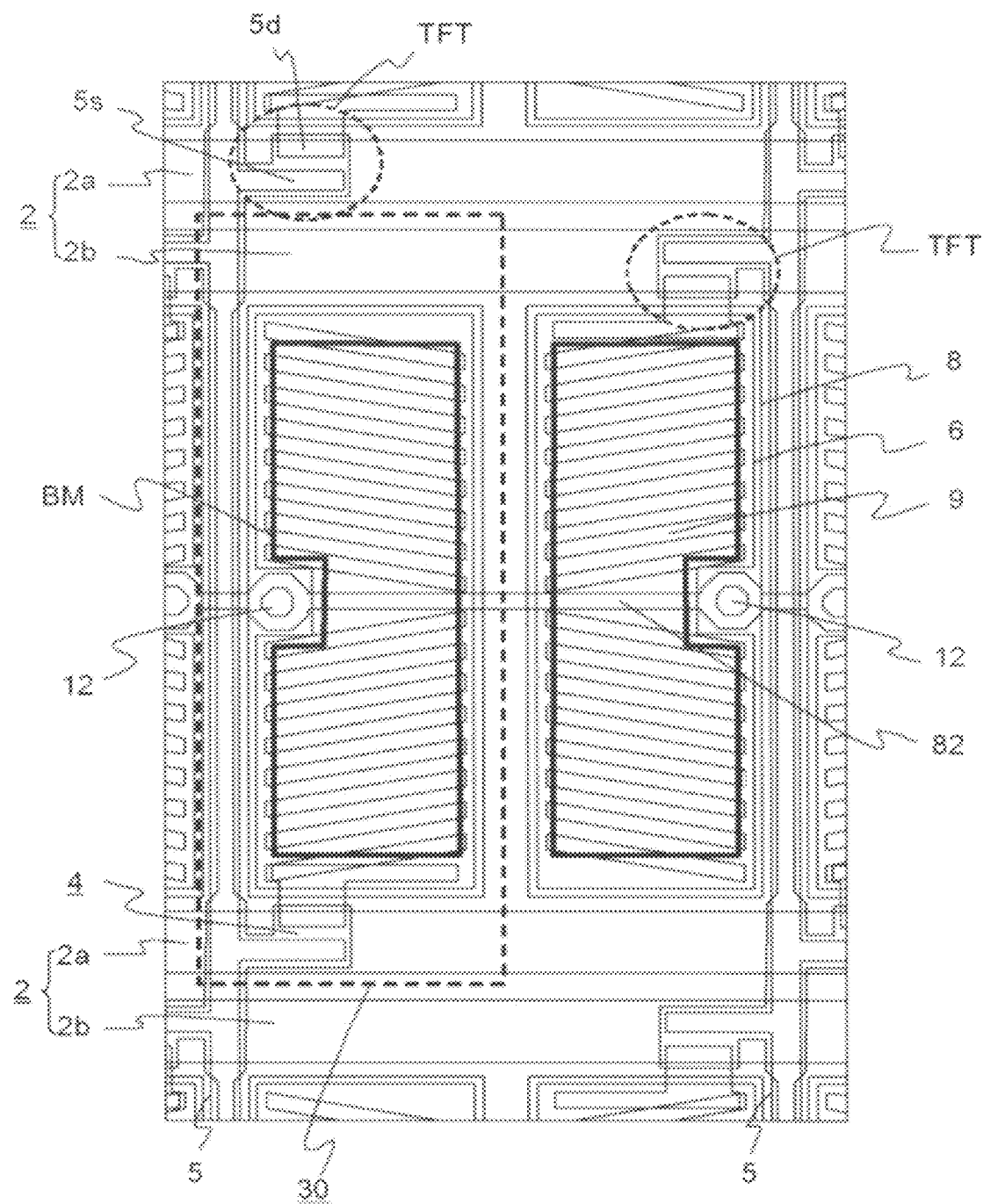
FIG. 7 is an enlarged plan view illustrating a configuration of two adjacent pixels in the liquid crystal display according to an comparative embodiment.

Next, the aperture ratio of exemplary embodiment 1 is compared with that of a comparative embodiment 1, in which the number of the signal lines 5 is simply reduced by half in a background pixel configuration. FIG. 7 is an enlarged plan view illustrating the configuration of two adjacent pixels in the liquid crystal display according to the comparative embodiment 1. In the comparative embodiment 1, the number of the signal lines 5 is simply reduced by half based on the background configuration of the pixels 30 of the FFS liquid crystal display 100. One contact hole 12 is an inefficient area with respect to the light transmission and is required to each pixel 30. The light transmission area is an inside area of the boundary of the black matrix (BM) represented by a bold line.

In the comparison between FIGS. 3 and 7, the contact hole 12 does not need to be disposed in each pixel 30 in the exemplary embodiment 1. Further, since the contact hole 12 may be disposed at the area where there is no signal line 5 under the black matrix area BM, there is no need to dispose the contact hole 12 in each pixel 30 and widen the black matrix area BM around the contact hole 12, as in the comparative embodiment 1, thereby increasing the aperture ratio.

In the comparative embodiment 1, since the number of the signal lines 5 is simply reduced by half, the common electrode 8 of two pixels 30 is separated from each other. The common electrode connecting part 84 is not disposed.

Even in the comparative embodiment 1, the common electrode 8 of the two adjacent pixels 30 may be possible to extend to be connected to the same layer or the common electrode connecting part 84 may be possible to be disposed. However, the aperture ratio is not increased.

Exemplary Embodiment 2

Figure 8:
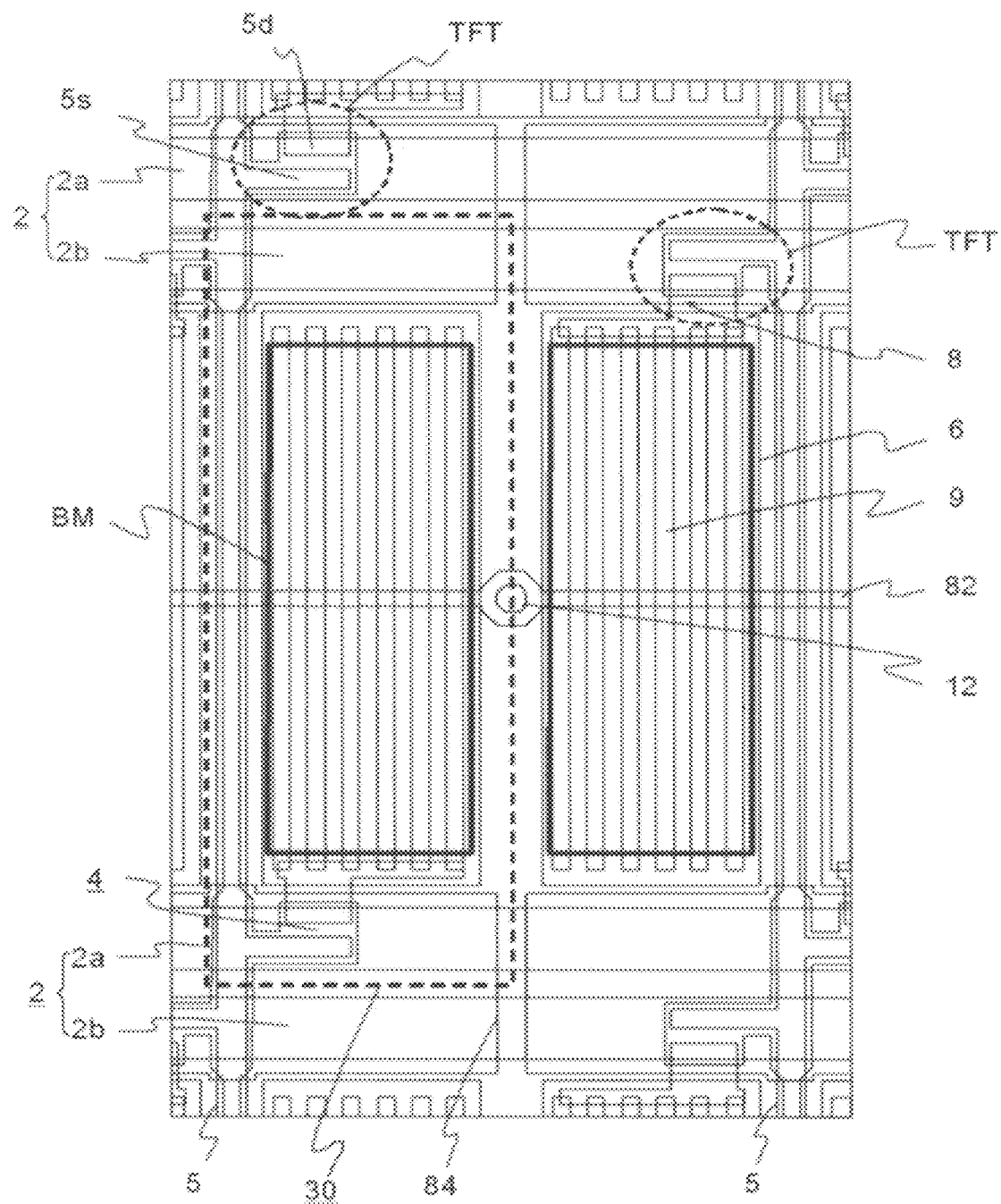
FIG. 8 is an enlarged plan view illustrating a configuration of two adjacent pixels in the liquid crystal display according to an exemplary embodiment 2 of the present disclosure.

FIG. 8 is an enlarged plan view illustrating the configuration of two adjacent pixels in the liquid crystal display according to an exemplary embodiment 2 of the present disclosure. As in the exemplary embodiment 1, under the black matrix area BM, one contact hole 12 is disposed at the intervening region of two adjacent pixels 30 without provided the signal line 5 and electrically connects the common signal line 82 and the common electrode 8. Accordingly, the common electrode 8 may be low resistance and may suppress the deterioration in the aperture ratio.

In the exemplary embodiment 2, the common electrode 8 also extends to be disposed on the signal line 5 in addition to the configuration of exemplary embodiment 1. One common electrode 8 is connected to the other common electrode 8 of the pixel 30 adjacent in the direction of the scanning line 2 across the signal line 5. As a result, the common electrode 8 disposed at the uppermost layer is connected with the common electrode 8 of the vertically and horizontally adjacent pixels 30 and has a lattice (mesh) shape. Accordingly, the resistance of the common electrode 8 may be decreased more than exemplary embodiment 1.

In the exemplary embodiment 2, the slits 9 are disposed in the direction of the signal line 5. Since the slits 9 are disposed in the direction of the signal line 5, the number of the slits 9 may be decreased as compared with the exemplary embodiment 1.

In this case, since the direction of the fringe electric field is changed at both ends of the slits 9, an area in which an alignment of the liquid crystal is not changed is generated. Accordingly, both ends of the slits 9 are a black area and do not contribute to the light transmission. Therefore, when the number of the slits 9 is to be small, the number of both ends of the slits 9 is to be small, thereby increasing light transmittance.

Unlike the exemplary embodiment 1, since a leakage electric field to the liquid crystal from the signal line 5 may be efficiently shielded by disposing the common electrode 8 on the signal line 5, the slits 9 may be disposed in the direction of the signal line 5. In plan view, the direction of the leakage electric field from signal line 5 is the direction of the scanning line 2, but when the liquid crystal is a positive type, an initial alignment direction of the liquid crystal is generally the slit 9 direction. When the slits 9 are provided in the direction of the signal line 5, the slits 9 is different from the direction of the leakage electric field from the signal line 5, so that there is a problem that the alignment of the liquid crystal is easily influenced by the leakage electric field from the signal line 5. That is, since a display characteristic is easily influenced by the leakage electric field from the signal line 5, this configuration, in which the common electrode 8 is disposed on the signal line 5, is effective in view of the display characteristic.

Exemplary Embodiment 3

Figure 9:
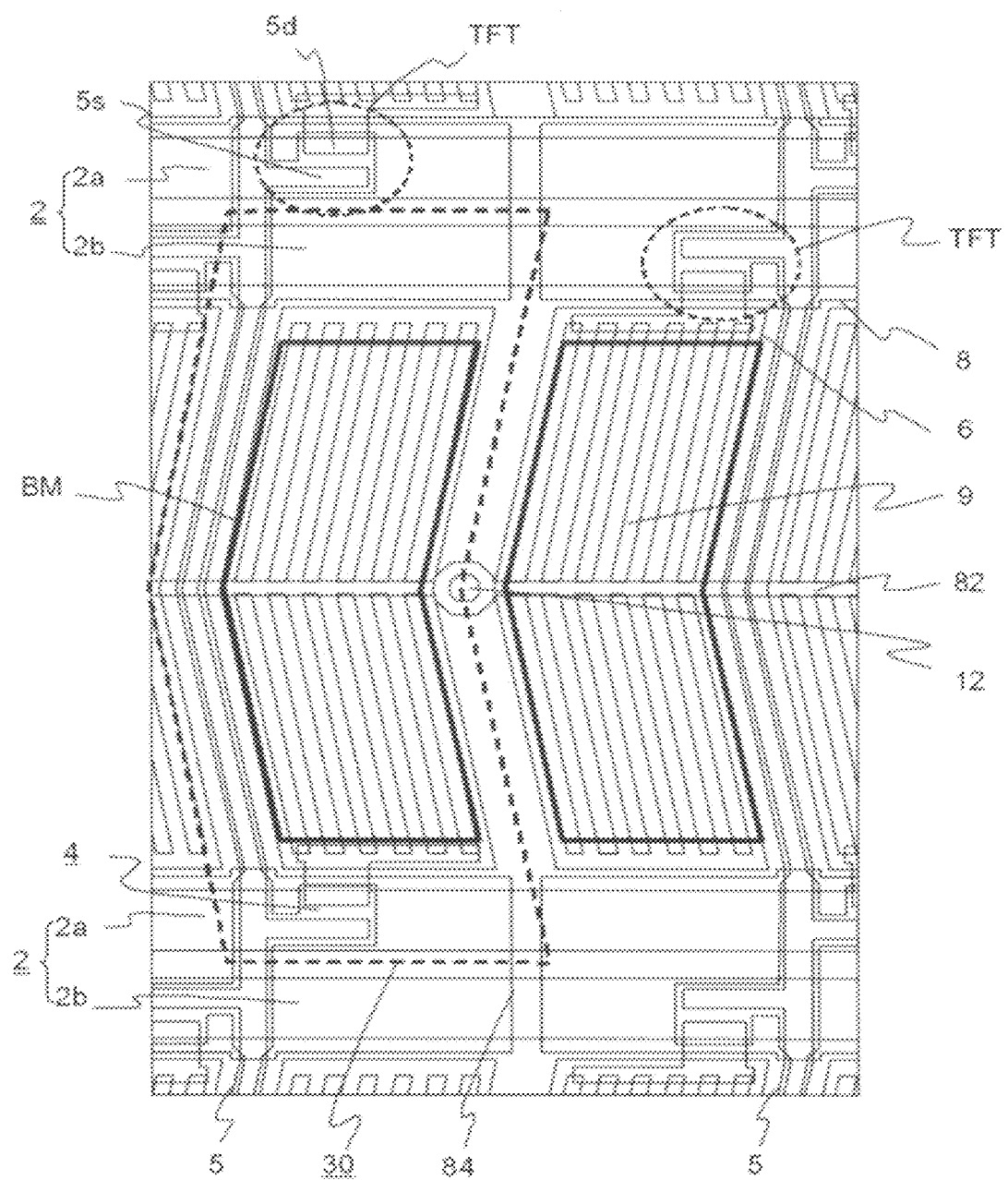
FIG. 9 is an enlarged plan view illustrating a configuration of two adjacent pixels in the liquid crystal display according to an exemplary embodiment 3 of the present disclosure.

FIG. 9 is an enlarged plan view illustrating the configuration of two adjacent pixels in the liquid crystal display according to an exemplary embodiment 3 of the present disclosure. In the exemplary embodiment 3, the slits 9 are disposed in two directions and the pixels 30 are multi-domained (alignment-divided) in addition to the configuration of exemplary embodiment 2. Accordingly, the viewing angle characteristic can be improved, so that color change according to the viewing angle direction is decreased. The slits 9 are divided at a bent portion.

Since the signal line 5 is also disposed in parallel with the slits 9, the pixels 30 have a bent shape so that the inefficient area for the light transmission is not increased.

The common signal line 82 is disposed at the bent portion, preferably. The reason is that the deterioration in light transmittance due to the common signal line 82 can be little by overlapping the common signal line 82, which is the inefficient area for the light transmission to the bent portion where there is no slits 9.

Even if the slits 9 are not divided at the bent portion, if the light non-transmission area, which is an alignment disturbed area (a domain area) of the liquid crystal generated easily at the bent portion, overlaps the common signal line 82 at the bent portion, the deterioration in light transmittance due to the common signal line 82 is to be little.

Also, the black matrix (BM) does not need to be disposed at the bent portion. Accordingly, the aperture ratio is not deteriorated by the black matrix (BM) and the multi-domain may be formed.

As in the exemplary embodiments 1 and 2, even in the exemplary embodiment 3, the aperture ratio in the contact hole 12 can be increased more than that of the comparative embodiment 1.

Exemplary Embodiment 4

Figure 10:
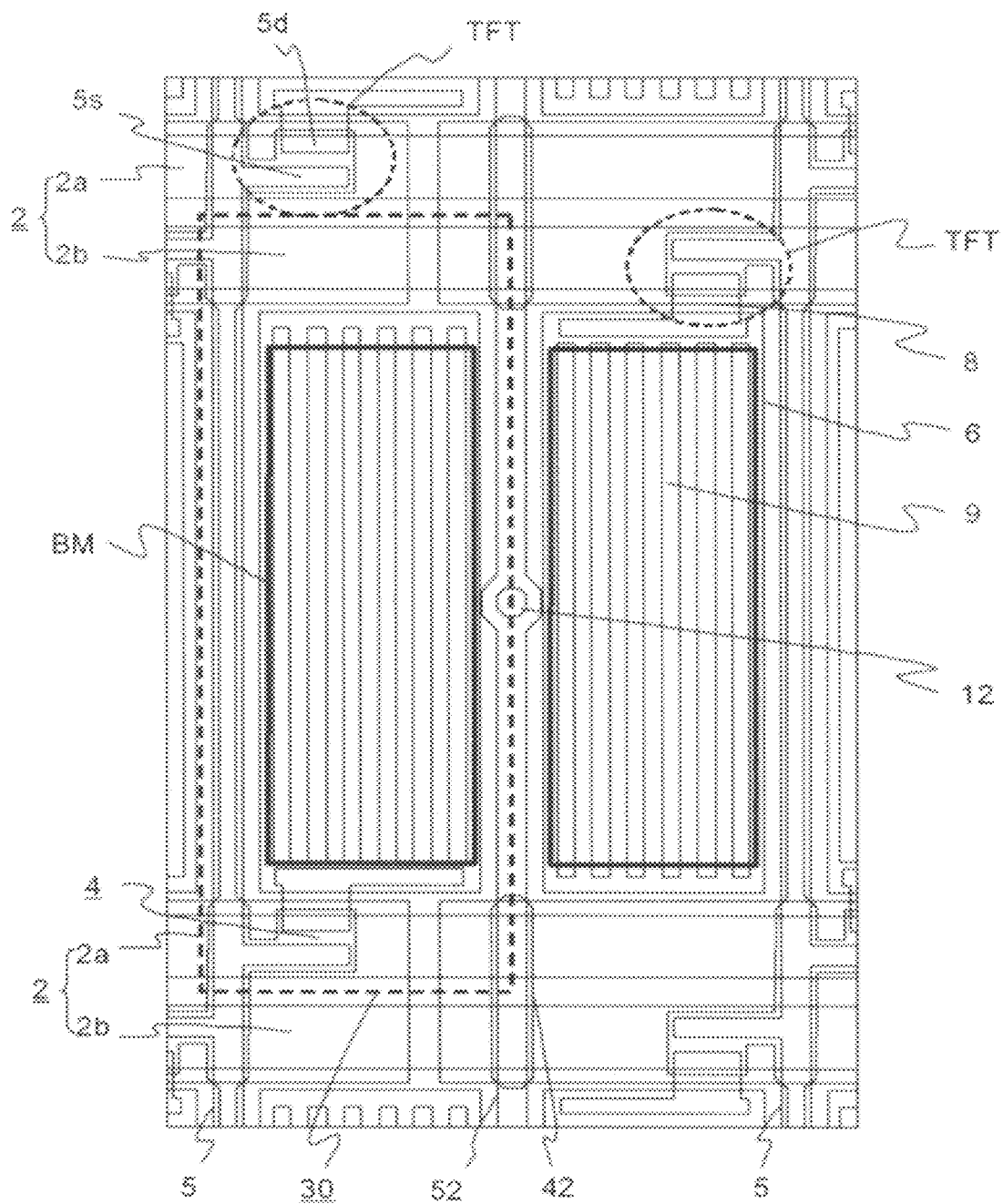
FIG. 10 is an enlarged plan view illustrating a configuration of two adjacent pixels in the liquid crystal display according to an exemplary embodiment 4 of the present disclosure.

FIG. 10 is an enlarged plan view illustrating a configuration of two adjacent pixels in the liquid crystal display according to an exemplary embodiment 4 of the present disclosure.

As in the exemplary embodiments 1 to 3, in the exemplary embodiment 4, under the black matrix area BM, the contact hole 12 connecting the common signal line 82 and the common electrode 8 is formed at the intervening region of two adjacent pixels 30 where there is no signal line 5. Accordingly, as in the exemplary embodiments 1 to 3, the aperture ratio can be increased more than that of the comparative embodiment 1.

In the exemplary embodiment 4, under the black matrix area BM, a common signal line 52 is formed in the direction of the signal line 5 at the intervening region of two adjacent pixels 30 where there is no signal line 5. In this case, the common signal line 52 is formed at the same layer as the signal line 5. Unlike the exemplary embodiments 1 to 3, since the common signal line 52 that is the inefficient area for the light transmission is not disposed in the direction of the scanning line 2 in the opening, the aperture ratio may be increased much more than that of the exemplary embodiments 1 to 3.

As the signal line 5 in an area where the common signal line 52 crosses the scanning line 2 (2a and 2b), a semiconductor layer 42 is formed at the bottom of the common signal line 52. Accordingly, as in the signal line 5, the common signal line 52 can suppress a disconnection or a short in a portion across the scanning line 2 (2a and 2b).

In the exemplary embodiment 4, one common electrode 8 extends on the signal line 5 to be connected with the other common electrode 8 of the pixel 30 adjacent in the direction of the scanning line 2 across the signal line 5. Accordingly, the slits 9 are disposed in the direction of the signal line 5 as in the exemplary embodiment 2, but the slits 9 may be disposed in the direction of the scanning line 2 as in the exemplary embodiment 1.

Exemplary Embodiment 5

Figure 11:
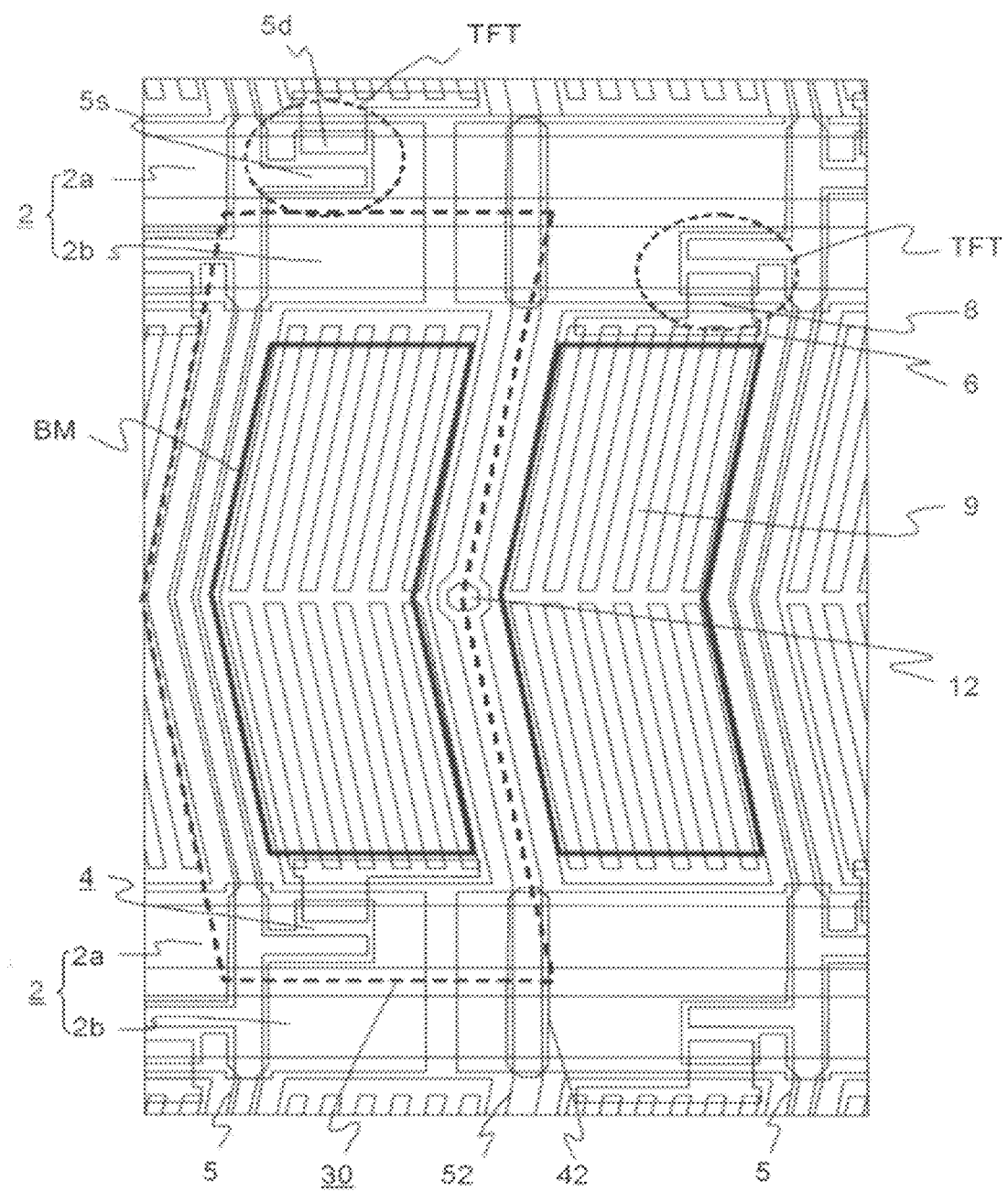
FIG. 11 is an enlarged plan view illustrating a configuration of two adjacent pixels in the liquid crystal display according to an exemplary embodiment 5 of the present disclosure.

FIG. 11 is an enlarged plan view illustrating the configuration of two adjacent pixels in the liquid crystal display according to an exemplary embodiment 5 of the present disclosure. In the exemplary embodiment 5, as in the exemplary embodiment 3, the pixels 30 is in a bent shape to configure the multi-domains and as in the exemplary embodiment 4, under the black matrix area BM, the common signal line 52 is formed in the direction of the signal line 5 at the intervening region of two adjacent pixels 30 where there is no signal line 5. Accordingly, exemplary embodiment 5 may have effects of both exemplary embodiments 3 and 4.

As in the exemplary embodiments 1 to 4, the aperture ratio about the contact hole 12 in the exemplary embodiment 5 can be increased more than that of the comparative embodiment 1.

As described above, the pixel configuration of the present disclosure may be combined of exemplary embodiments 1 to 5 in various forms.

In the above exemplary embodiments, the FFS configuration, in which the lower electrode is the pixel electrode 6 and the upper electrode is the common electrode 8, is described. However, a configuration, in which the lower electrode is the common electrode 8 and the upper electrode is the pixel electrode 6, may also be adopted. The contact hole 12 shared in the adjacent pixels 30 in the direction of the scanning line 2 may be used to the connection of the common electrode 8 and the common signal line 82. Even in this case, under the black matrix area BM, the contact hole 12 is formed at the intervening region of the adjacent pixels 30 where there is no signal line 5.

In the above exemplary embodiments, the TFT is a channel etch reverse staggered type. However, an etch stopper reverse staggered type and a top gate type may be used.

In the above exemplary embodiments, the driving circuit is mounted by the COG. However, the driving circuit may be mounted by a Tape Automated Bonding (TAB). Further, it is applied to the liquid display panel and the liquid crystal display, in which the driving circuit is formed with a polysilicon TFT on the array substrate at the same time with forming the TFT of the pixels.

What is claimed is:

1. A liquid crystal panel, comprising:
an array substrate including:
a display area, in which a plurality of pixels disposed in a matrix form on a substrate, wherein the pixel includes:
a switching device;
a lower electrode;
an insulating layer formed on the lower electrode;
an upper electrode, which has a plurality of slits to generate a fringe electric field between the lower electrode and the upper electrode, and which is formed on the insulating layer; and
a common signal line, which supplies a predetermined common potential, and which is formed at a layer lower than the insulating layer;
a signal line crossing the scanning line; and
a contact hole; and
an opposite substrate including a black matrix and arranged to be opposite to the array substrate with sandwiching a liquid crystal,
wherein one electrode of the upper electrode and the lower electrode is a pixel electrode connected to the switching element, and the other electrode thereof is a common electrode having the predetermined common potential,
wherein the signal line is disposed at every two pixels adjacent in a scanning line direction,
wherein the contact hole connects the common electrode and the common signal line, and
wherein the contact hole is shared by the adjacent two pixels and is formed at an intervening region of the two adjacent pixels in which the signal line is not provided.

2. The liquid crystal panel according to claim 1,
wherein, in the intervening region of the two adjacent pixels in which the signal line is not provided, the common electrode of one of the two adjacent pixels is connected with the common electrode of the other of the two adjacent pixels at a same layer.

3. The liquid crystal panel according to claim 1,
wherein one common electrode is connected to the other common electrode of the pixel adjacent in a signal line direction across the scanning line.

4. The liquid crystal panel according to claim 1,
wherein the slits of the upper electrode are disposed in two symmetric directions at a predetermined equal angle with respect to the scanning line direction.

5. The liquid crystal panel according to claim 1,
wherein the slits of the upper electrode are disposed in parallel with the signal line direction.

6. The liquid crystal panel according to claim 1,
wherein one common electrode is connected with the other common electrode of the pixel adjacent in the scanning line direction across the signal line.

7. The liquid crystal panel according to claim 1,
wherein the common signal line is formed at a same layer as the scanning line, and
wherein the common signal line is formed in the scanning line direction.

8. The liquid crystal panel according to claim 1,
wherein the signal line includes a bent portion.

9. The liquid crystal panel according claim 8,
wherein the common signal line crosses the signal line at the bent portion.

10. The liquid crystal panel according claim 1,
wherein the lower electrode is the pixel electrode and the upper electrode is the common electrode.

11. A liquid crystal display including the liquid crystal panel according to claim 1.

12. A liquid crystal panel, comprising:
an array substrate including:
a display area, in which a plurality of pixels disposed in a matrix form on a substrate, wherein the pixel includes:
a switching device;
a lower electrode;
an insulating layer formed on the lower electrode;
an upper electrode, which has a plurality of slits to generate a fringe electric field between the lower electrode and the upper electrode, and which is formed on the insulating layer;
a common signal line, which supplies a predetermined common potential, and which is formed at a layer lower than the insulating layer;
a signal line crossing the scanning line; and
a contact hole; and
an opposite substrate including a black matrix and arranged to be opposite to the array substrate with sandwiching a liquid crystal,
wherein one electrode of the upper electrode and the lower electrode is a pixel electrode connected to the switching element, and the other electrode thereof is a common electrode having the predetermined common potential,
wherein the signal line is disposed at every two pixels adjacent in a scanning line direction,
wherein the contact hole connects the common electrode and the common signal line,
wherein the contact hole is shared by the adjacent two pixels and is formed at an intervening region of the two adjacent pixels in which the signal line is not provided,
wherein the common signal line is formed at a same layer as the signal line in the intervening region of the adjacent pixels in which the signal line is not provided, and
wherein the common signal line is formed in the signal line direction.

* * * * *